United States Patent [19]

Duncan

[11] Patent Number: 4,697,840
[45] Date of Patent: Oct. 6, 1987

[54] SNUBBER DEVICE FOR PARALLELOGRAM GRAPPLE

[75] Inventor: Michael Duncan, Wamego, Kans.
[73] Assignee: Balderson Inc., Wamego, Kans.
[21] Appl. No.: 887,203
[22] Filed: Jul. 21, 1986
[51] Int. Cl.<sup>4</sup> ............................ B66C 1/00; F16F 1/16
[52] U.S. Cl. ................................. 294/119.4; 267/153; 267/279
[58] Field of Search ..................... 294/86.4, 88, 119.4; 267/57.1 R, 57.1 A, 63 R, 63 A, 141, 153, 154; 403/113, 120, 221, 223, 225, 226

[56] References Cited

U.S. PATENT DOCUMENTS

| | | | |
|---|---|---|---|
| 1,541,276 | 6/1925 | Powell | 403/225 X |
| 3,301,587 | 1/1967 | Heikkinen | 294/119.4 X |
| 3,545,737 | 12/1970 | Lamprey et al. | 267/57.1 R |
| 3,560,040 | 2/1971 | Funk | 294/88 X |

OTHER PUBLICATIONS

"Rubber-A New Material in Machine Design", published by Lord Mfg. Co., date stamped 3-29-33.

Primary Examiner—Johnny D. Cherry
Attorney, Agent, or Firm—Burns, Doane, Swecker & Mathis

[57] ABSTRACT

The device of the present invention provides a mechanism which arranges a set of elastomeric blocks, one adjacent the other, in separate housings, so as to limit rotation between an input and an output of the housings and in which a surface of a bushing arrangement cooperates with the device so as to limit rotation of a shaft and housing arrangement of the bushing. The structural arrangement limits radial loading and, improves wear life of the elastomeric block.

7 Claims, 3 Drawing Figures

U.S. Patent  Oct. 6, 1987  4,697,840
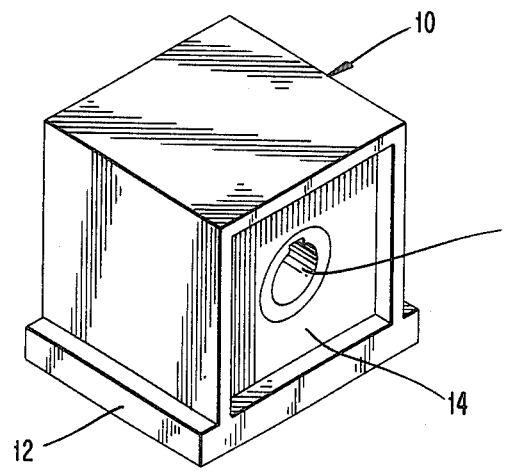
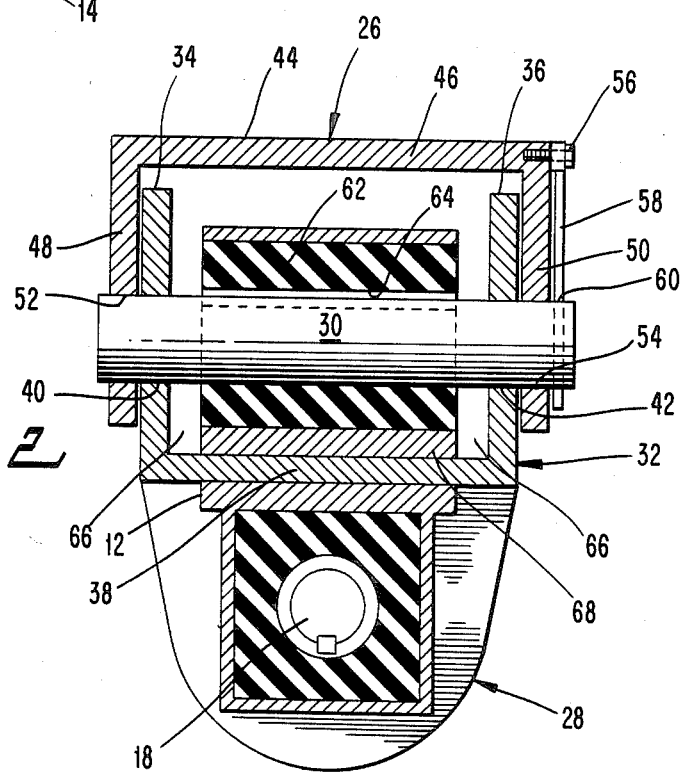
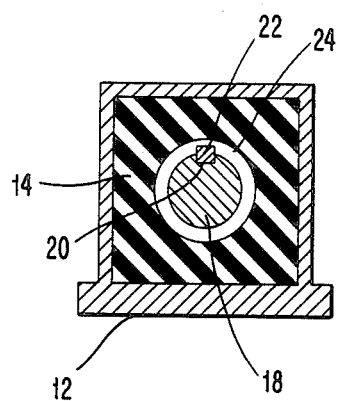

4,697,840

SNUBBER DEVICE FOR PARALLELOGRAM GRAPPLE

BACKGROUND OF THE INVENTION

The present invention relates to a snubber device for use in a grapple. The grapple is intended for use in a skidder mechanism which is utilized for the movement of logs and other similar type material in rough terrain.

The prior art snubber devices require periodic adjustment, tightening and lubrication. Due to these requirements, a skidder was out of service during the down time required for such maintenance.

Prior art devices of this type are exemplified by U.S. Pat. Nos. 3,525,547 and 3,560,040. In U.S. Pat. No. 3,525,547 metal bushing supports are carried concentrically with casing members with the supports having bonded to their outer surfaces elastomer bushings that fill the space between the support elements and the cylindrical casings. In a relaxed condition, a bushing has an outer surface that is tapered slightly at one end and has a small annular surface groove. The bushings are pressed axially into the respective casings so that their respective outer surfaces frictionally engage the inner cylindrical surface of the casing. It is particularly noted that an evaporative type of lubricant is provided for inserting the bushing and that a more permanent type of lubricant is used to increase wear characteristics of the bushing.

The arrangement includes an upper bushing fixed against movement with respect to the boom of the skidder and a lower bushing fixed against movement relative to a housing support. Due to this arrangement, a movement is permitted so as to overcome the frictional resistance between the bushings and their casings. Frictional resistance between the bushings and the casings is increased or decreased by confining or releasing pressure on the bushings so as to prevent free oscillation about the axis of the grappler attachment to the boom of the machine.

U.S. Pat. No. 3,560,040 is quite similar in disclosure with respect to the bushing structure and contains more detail of the connection of the structure to the grappler hooks.

Accordingly, the prior art snubbers can be characterized as having rubber bushings contained in casings that are connected to a boom and a boom support, of a skidder, respectively. An outer surface is frictionally and resiliently engaged with the cylindrical walls of the casings. The prior art snubbers support the load lifted by the grappler due to the inner connection of the support plates of the snubber and the grapple. This arrangement causes the prior art snubbers to periodically need adjustment, tightening and lubrication.

SUMMARY OF THE INVENTION

The present invention is directed to overcoming the above-identified problems of the prior art. According to the present invention, an elastomeric block is mechanically fixed to an outer casing of the snubber so as to provide torsional resistance to relative movement between the boom arm and the grappler of the skidder. This feature is obtained by using a square or rectangular block bushing having a rotational limiting device defined within the bushing and having a surface cooperating with the device to prevent rotation of the shaft and housing arrangement of the bushing block. Due to this arrangement, the elastomeric block is not radially loaded and is not subjected to the wear of the prior art snubbers.

BRIEF DESCRIPTION OF THE DRAWINGS

FIG. 1 is an elevated perspective view of the elastomeric joint inserted into a steel block;

FIG. 2 is an elevated, side sectional view of the joint connection of the snubber between a boom arm and a grappler hook; and FIG. 3 is an elevated side sectional view of the steel block of FIG. 1.

DETAILED DESCRIPTION OF THE INVENTION

FIG. 1 shows a portion of the snubber arrangement of the present invention indicated generally by the reference numeral 10 shown. A steel block 12 encases an elastomeric joint 14. An opening 16 is provided in the interior of the elastomeric block for receiving a pin member which is attached to the grapple head (not shown).

With respect to FIG. 3, the cross-sectional view shows a block and elastomeric joint with the steel pin 18 received within the opening 16. This type of pin member is provided with a key way 20 for receiving a key 22 connecting the pin with the interior 24 of the elastomeric block.

FIG. 2 shows the attachment of the steel block 12 with an upper member indicated generally at 26, further discussed below. The grapple head is indicated generally at 28 and is connected to the pin 18 secured within the elastomeric block 14.

The upper casing 26 is connected to the boom arm (not shown) of a tractor device utilized in the rough terrain for grappling the logs and moving logs and similar material to a loading station. The upper casing is provided with a pin 30 which extends transversely to the pin 18 and supports the upper part of the casing 26. A center joint arrangement is indicated generally at 32 and consists of two flange portions 34, 36 integrally joined with a base portion 38. The center joint connects the upper structure 26 and the grapple head assembly 28. The flange portions 34, 36 are provided with center openings 40 and 42 for accommodating passage of the pin 30 there through.

An upper, inverted assembly 44 is provided with a base portion 46 and, integral therewith, downwardly extending flange sections 48 and 50. The flange sections 48 and 50 are provided with bores 52 and 54 for passage of the pin 30 there through. A pin member 56 is inserted into base portion 46 of the upper casing element 44 and secures thereto an antirotation element 58. The antirotation element 58 is also provided with an opening 60 for the pin 30.

The upper assembly 44 includes an elastomeric bushing 62 engaged to the pin 30 by a keyway path 64 in this example, connecting the elastomeric element 62 with the pin 30 when a key (not shown) is inserted into the keyway path 64. The elastomeric bushing 62 is provided with a clearance fit interior of the flange sections 34 and 36. The bushing 62 is provided in a rectangular or square-shaped casing 68.

In operation, the snubber of the present invention is connected between the boom arm assembly (not shown) of a skidder loader and the grapple head indicated generally at 28. The grapple head 28 is connected to the pin 18 received in the elastomeric block 14. The snubber functions to dampen the swinging movement between the snubber and the boom arm and between the snubber and the grapple head 28. The snubber provides torsional resistance to movement when the grapple head 28 loads the pin 18 of the elastomeric block 10. Due to the key 22 interfitting with the elastomeric block 14 and the pin 18, the torsional resistance to rotation is provided. Accordingly, the only movement that is allowed is the flexing of the elastomeric block 14 with respect to the housing 12. Due to the substantially rectangular or square-shape of the housing, the elastomeric material 14 is restricted in movement in the aforedescribed manner. Further, the snubber of the present invention does not require a lubricant in order to permit the torsional movement required of snubbers in the prior art. This is due to the fact that the torsional movement of the prior art snubbers requires that the elastomeric elements of the snubbers be provided with lubricant. Such lubricant is not needed in the snubber of the present application and, since the elastomeric block fits totally within the rectangular or square-shaped housing, there is no need for periodic adjustment due to slippage between the elastomeric block and the housing to which it is bonded.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. In a snubber device, the combination comprising: a first assembly having a first U-shaped member and a second U-shaped member, the first member provided with first flange sections and a first base section, the flange sections extending substantially perpendicular to the base section; the second member provided with second flange sections and a second base section; the second flange sections positioned interiorly of the first flange sections and connected with the first flange sections by a pin member extending through openings provided in each of the flange sections; a first elastomeric member positoned interiorly of the second flange sections and connected to the pin member; a second assembly including an integral housing having a base member with an interior perimeter of the housing being substantially square and having a second elastomeric member received in and bonded to the interior perimeter; an opening provided in the second elastomeric member; an additional pin member received in the opening and lockingly engaged with the second elastomeric member; the second assembly directly connected to the second base section so as to prevent relative movement therebetween.

2. The snubber device of claim 1 wherein the base member of the integral housing is connected to the second base section on a side of the second base section opposite the first elastomeric member.

3. The snubber device of claim 1, wherein an anti-rotation member is secured to one of the first flange sections and receives the pin member in an opening.

4. The snubber device of claim 1, wherein the second elastomeric member resists torsional movement of the additional pin member.

5. The snubber device of claim 1, wherein the second elastomeric member limits torsional movement of the additional pin member to 45° or less when the additional pin member is under load.

6. The snubber device of claim 1, wherein the second elastomeric member prevents torsional movement of the additional pin member in the absence of a load.

7. The snubber device of claim 1, wherein the second elastomeric member is utilized to resist torsional movement of the additional pin member while permitting radial and longitudinal movement of a grapple member connected to said additional pin member.

* * * * *